United States Patent
Fear

(10) Patent No.: US 11,169,858 B2
(45) Date of Patent: Nov. 9, 2021

(54) FASTER GAME ENABLEMENT UTILIZING VIRTUAL MACHINE REUSE

(71) Applicant: Nvidia Corporation, Santa Clara, CA (US)

(72) Inventor: Andrew Fear, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 259 days.

(21) Appl. No.: 16/010,015

(22) Filed: Jun. 15, 2018

(65) Prior Publication Data

US 2019/0384644 A1    Dec. 19, 2019

(51) Int. Cl.
*G06F 9/50* (2006.01)
*A63F 13/49* (2014.01)
*A63F 13/48* (2014.01)

(52) U.S. Cl.
CPC ............ *G06F 9/5077* (2013.01); *A63F 13/48* (2014.09); *A63F 13/49* (2014.09); *A63F 2300/535* (2013.01); *A63F 2300/636* (2013.01)

(58) Field of Classification Search
CPC .... A63F 13/352; A63F 13/355; A63F 13/358; A63F 13/48; A63F 13/49; A63F 2300/535; A63F 2300/636
See application file for complete search history.

(56) References Cited

U.S. PATENT DOCUMENTS

| | | |
|---|---|---|
| 8,583,761 B2 | 11/2013 | Park et al. |
| 8,634,943 B2 | 1/2014 | Root |
| 9,189,285 B2 * | 11/2015 | Ng .......................... G06F 9/505 |
| 9,272,218 B2 | 3/2016 | Ikenaga et al. |
| 9,433,862 B2 | 9/2016 | Bruno, Jr. et al. |
| 9,474,973 B2 | 10/2016 | Perry et al. |
| 9,545,574 B2 | 1/2017 | Justice et al. |
| 9,578,088 B2 | 2/2017 | Nickolov et al. |
| 2006/0189382 A1 * | 8/2006 | Muir .................. G07F 17/3232 463/29 |
| 2007/0265094 A1 | 11/2007 | Tone et al. |

(Continued)

FOREIGN PATENT DOCUMENTS

| | | |
|---|---|---|
| CN | 106909432 A | 6/2017 |
| EP | 2745893 A2 | 6/2014 |

OTHER PUBLICATIONS

Hong, et al.; "Placing virtual Machines to Optimize cloud Gaming Experience"; iis.sinica.edu.tw/~swc; Publication Date Jul. 2014; Updated May 20, 2018; 22 pgs.

(Continued)

*Primary Examiner* — Jorge A Chu Joy-Davila

(57) ABSTRACT

The disclosure is directed to a method of operating a game system where virtual machines (VM) supporting the game session can be reused by a second user after a first user ends their game session. In another aspect, the VM can be shut down if the number of VMs exceeds a target number of VMs or if an abnormality is detected in the VM. In another aspect, VMs can be instantiated in order to meet a target number of VMs. In another aspect, a software application is disclosed to execute the methods described herein. In another aspect, a game services system is disclosed that can operate a VM group, maintain a status parameter of the instantiated VMs, and service user requests for game sessions.

18 Claims, 6 Drawing Sheets

(56) References Cited

U.S. PATENT DOCUMENTS

| | | | | |
|---|---|---|---|---|
| 2013/0212595 A1* | 8/2013 | Fanning | ............... | G06F 9/44521 |
| | | | | 719/313 |
| 2014/0189685 A1* | 7/2014 | Kripalani | ............ | G06F 9/45533 |
| | | | | 718/1 |
| 2014/0215267 A1* | 7/2014 | Hegdal | ............... | G06F 9/45558 |
| | | | | 714/20 |
| 2014/0342819 A1* | 11/2014 | Bruno, Jr. | ............. | G06F 9/5061 |
| | | | | 463/29 |
| 2015/0249615 A1* | 9/2015 | Chen | .................. | G06F 9/45558 |
| | | | | 709/226 |
| 2015/0261561 A1* | 9/2015 | Ashok | ..................... | H04L 47/70 |
| | | | | 718/1 |
| 2015/0378765 A1* | 12/2015 | Singh | ........................ | G06F 9/50 |
| | | | | 718/1 |
| 2016/0216986 A1* | 7/2016 | Singh | .................. | G06F 9/45558 |
| 2016/0256775 A1 | 9/2016 | Gustafson et al. | | |
| 2016/0277483 A1* | 9/2016 | Byskal | .................. | H04L 67/306 |
| 2017/0087464 A1 | 3/2017 | Perry et al. | | |
| 2017/0286148 A1* | 10/2017 | Zou | ..................... | G06F 9/45558 |
| 2018/0129524 A1* | 5/2018 | Bryant | .................. | G06F 11/301 |

OTHER PUBLICATIONS

Li, et al.; "Let's Depart Together: Efficient Play Request Dispatching in Cloud Gaming"; IEEE; 978-1-4799-6882-4/14; Dec. 2014; 6 pgs.

* cited by examiner

FASTER GAME ENABLEMENT UTILIZING VIRTUAL MACHINE REUSE

TECHNICAL FIELD OF THE DISCLOSURE

The present disclosure is directed, in general, to a centralized game system and, more specifically, to a cloud game system managing multiple virtual machines.

BACKGROUND OF THE DISCLOSURE

A cloud game system can be organized where user(s) can be assigned a computing environment. The computing environment can be configured in several ways. For example, a dedicated physical server can be allocated to support the needs of the user(s) or the user(s) can be allocated their own virtual environment.

Some cloud game systems allow individual users to have their own unique computing environment by creating a virtual machine (VM) for a user. Creating a VM for the user, loading in an operating system and a game application, can take time and use valuable computing resources, such as memory, network and data storage bandwidth, and other resources.

SUMMARY OF THE DISCLOSURE

In one aspect, the disclosure provides a method of operating a game system. In one example the method includes: (1) maintaining a VM in a virtual machine group (VMG), (2) determining when a user has ended a game session using the VM, (3) updating the status parameter of the VM, and (4) shutting down the VM when the status parameter indicates that the VM not be reused.

In another aspect, the disclosure provides, a non-transitory computer readable medium storing instructions that, when executed by a data processing apparatus, perform operations. In one example, the operations include: (1) operating a VMG that includes one or more active VMs, where the VM is configured to support an application session, (2) determining a target number of active VMs, and (3) shutting down the active VMs in excess of the target number.

In yet another aspect, the disclosure provides a game service system. In one example, the game service system includes: (1) an identity management server that can manage user data and correlate the user data to a game type, and (2) a processor, communicatively coupled to the identity management server, operable to manage a VMG having one or more VMs, maintain and track the status parameter of each VM, allocate a VM to meet users' requests, load user data retrieved from the identity management server, and enable the user game session.

BRIEF DESCRIPTION OF THE DRAWINGS

For a more complete understanding of the present disclosure, reference is now made to the following descriptions taken in conjunction with the accompanying drawing, in which.

DETAILED DESCRIPTION

Figures 1A, 1B:
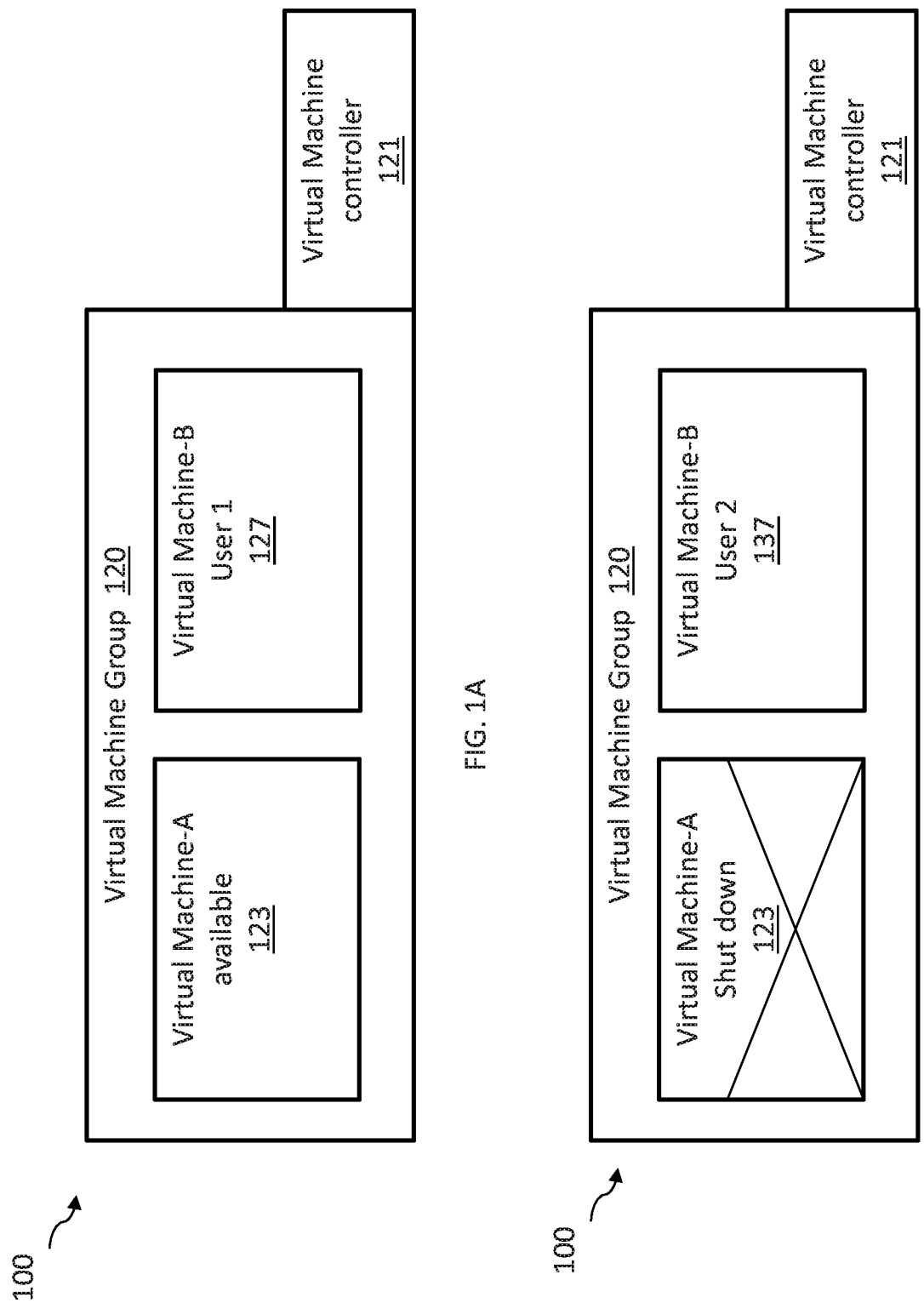
FIG. 1A and FIG. 1B illustrate diagrams demonstrating an example of how the disclosed methods can manage multiple virtual machines (VM)

Creating or establishing a VM within an application or game system computing environment can be costly in terms of computing processing time, network and communication bandwidth, memory usage, and other factors. For example, once a user requests to play a game, or run an application of various types, a new VM would need to be created, an operating system would need to be loaded into the VM, and a runnable game or application type would need to be loaded within the VM. Accordingly, a method to manage multiple active VMs in a system computing environment (system) for applications or games to reduce the usage of computing resources can be beneficial.

This disclosure recognizes that an optimum number of instantiated VMs can be established to reduce the time between a user's request and enablement of applications and games and to conserve computing resources. For this disclosure, a VM is a computing system environment emulator that includes an operating system and can run at least one application or game type. Multiple VMs can exist on one or more physical computing devices, such as computer servers, and the VMs can be linked or kept separated, as appropriate by a VM controller. For example, a game type may utilize one or more VMs for a user playing the game type; therefore, the VMs used by the user would be linked. A game type can be a type of game application or set of applications. For example, a game type can be BioShock 2®, Call of Duty®, Assassin's Creed®, Tomb Raider®, and other game types offered through the game system.

User data and user configuration information can be loaded into the VM. Collectively, the loaded information in the VM, i.e. the VM control software, the operating system, the game type, and user data and configuration information, is a game session. Similarly, an application session is the loaded information in the VM, i.e., the VM control software, the operating system, the application type, and user data and configuration information. Hereon the term game may be used in examples that also apply to an application or applications.

Depending on the various parameters being used for the VM, launching a game type on the above described game system can utilize a significant amount of computing resources and can result in a delay before the game session is enabled for the user. Enabling a game session for a user is the point in time where the user can begin interacting with the game session.

In one example scenario, from a time when a user requests to play a game type to a time when the game session is enabled for the user, the process can take thirty seconds to one minute while loading seventy to eighty gigabytes (GB) of data. As the number of VMs increase within the game system environment, the time utilized to start up a new VM can increase since some computing resources, such as processors, memory, data store access, and network bandwidth, is shared between the VMs.

It is not beneficial to maintain multiple VMs of a game type if the user demand for the game type is lower than the number of available VMs. A VM, while running, even without user interaction, consumes computing resources. Having too many VMs waiting for users can negatively impact the game system. For example, the excess utilized computing resources can include processing cycles, network traffic and bandwidth, data store access, input/output operations, electrical power to run the physical servers where the VMs are located, electrical power to run air conditioning equipment in the physical location, and other data center resources, such as additional square footage to support additional physical servers and additional human operations staff. These computing resources have a financial cost to the operator of the game system.

Typically, a VM is shut down when the VM is no longer being utilized by a user. A new VM can then be instantiated when a user requests a game session. The time utilized to move a VM from instantiation to a time when the VM is enabled for a user can be significantly long, as described in the example above, and can negatively affect a user's overall game experience.

This disclosure reduces the time for servicing a user request for a game session by maintaining a group of VMs preloaded with one or more selected game types. The group of VMs is maintained in a virtual machine group (VMG). The VMG is a logical grouping of VMs. A VMG can be located on one or more physical computing servers where the computing servers can be located proximate or separate from one another. The VMG can also be located in a cloud computing services environment. A VMG can be located in a cloud computing services environment where the physical computing servers for the cloud environment can be located in one or more separate locations. For example, a VMG can be a cloud services computing environment where the physical servers are located in a data center in diverse locations, such as California, Oregon, Virginia, and Central Europe.

When a new user connects to the game system to play a game, the user's settings and configuration information are updated in an existing and available VM and the game session is restarted and enabled for the user. In this aspect, the VM has already been created and instantiated, the operating system has been loaded, and the game type has been loaded prior to the user's request resulting in reduced time and computing resources for moving the VM to a user enabled state. This can therefore improve a user's game experience by decreasing the time to enable the game session for a particular user. For example, using a similar computing environment and game type as used in the example above, the time to enable a VM for a user can be reduced to one to five seconds (from thirty seconds to one minute as described above) while loading one to two Megabytes (Mb) of data (from seventy to eighty GB as described above).

In another aspect, when a user is no longer utilizing the VM, the VM can update its status parameter to indicate that the VM is available and a second user can reuse the game already loaded on the VM, i.e., the VM can be reused. A reused VM is defined as a VM that is active with a game already loaded and accepts a new user's data and configuration information for a new game session. A VM that is not reused is a VM that is destroyed, e.g., shutdown or closed, and the game that was already loaded is not used by another user. The state where a user is no longer utilizing the VM can be detected through one or more criteria. For example, the user can actively select to return to a main or home page, select an exit, quit, cancel, or other command, or the user can abandon the game session, such as when the game session does not receive a command from the user within a timeout period or the computing communication coupling between the user's computing system and the VM is lost.

An example of this aspect can be that User 1 was playing a game and was using a VM loaded with a specific game type. When User 1 quits playing the game, the VM and game session remain active. The VM status parameter within the VMG changes to an available state. In another aspect, the VM can move to an ended game session state for the game session. The game session can proceed, or be directed to, a determined game session screen, menu, or another game session state.

At a time when User 2 requests a game session utilizing the same game type as User 1, the VM, previously used by User 1, can be allocated to User 2. User 2's data and configuration information, which may include saved game or last saved point information, can be loaded into the game session and the game session enabled for User 2 to begin interacting with the game session at a beginning point or at the last saved point.

The user data and configuration information can be stored in an identity management system (IMS) which can be a data store, database, or other storage mechanism. The IMS can be located proximate or separate from the VMG. The IMS can correlate user's information with the game type selected so that specific game type data and configuration information can be loaded for the user. The user's data and configuration information can differ for the game type selected.

Thus, in the disclosed game system, if a subsequent user requests access to a game type, that user can be assigned a running and available VM. VMs actively being utilized by other users are not considered available, i.e. would not have a status parameter of available. The subsequent user's data and configuration information can be swapped into the game session within the VM and the game session can be enabled using the new user's data. This process of 'hot swapping' user data can reduce the time taken, and reduce the amount of computing resources used, to enable the new user's game session.

Additional controls can be established with the disclosed game system, such as when the game system is scaled with multiple VMs supporting multiple user game sessions. In one aspect, a VM controller can be used to determine a target number of VMs. The target number can be a total number of instantiated VMs whether the VMs are utilized by a user or have an available status parameter. The target number can also be the number of active and not being utilized, i.e. available, VMs for a game type. The VM controller can shut down an excess of available VMs that exceed the target number of VMs. For example, if the total of actively used VMs and available VMs is targeted at twenty and there are fifteen VMs being actively used, then, if there are more than five available VMs, the number of VMs in excess of five can be shut down to save computing resources.

There could be more than twenty VMs for a game type, for example, if more than twenty users are playing that game type within a time period. This disclosure does not restrict the instantiation of additional VMs should user demand so direct the game system.

In one aspect, the VM controller can instantiate additional VMs for a game type if the target number of VMs is not reached. For example, the game system can be shut down for a maintenance cycle. When the game system restarts, the target number of VMs can be automatically instantiated.

The target number, for a game type, can vary according to various factors, such as, the time of day, the day of the week, the day of the year, calendar holidays, usage patterns, and the physical location of the computing environment. For example, a game system, for a game type, can set a low target number at nine am on a Tuesday in September, since the game type's target user base is not likely to be using the game system at that time, i.e. the typical user may be in school or at work. At three pm on Christmas Day, the target number can be set to a significantly higher value. A physical location factor can be demonstrated where a game system can have a higher target number in a Virginia data center and a lower target number in an Oregon data center due to the time zone differences. In addition, local weather conditions and local country holidays and celebrations can also be used in determining a target number for any time period.

Different game types can have different target numbers for the same time period. For example, a LEGO® game may have a lower target number late at night since its typical user can be a younger child, while Middle-Earth: Shadow of War® would have a higher target number for that same time period since its typical user can be an older child. A target number can also be determined from usage patterns, historical data, and external factors. For example, a game type associated with a movie can increase its target number around a time when a movie associated with the game type is released for public viewing, such as increasing the target number of VMs for LEGO Star Wars: The Force Awakens® around the time the next Star Wars® movie is released to movie theaters.

In another aspect, the VM controller can inspect, check, scan, or otherwise determine the status parameter of a VM when the VM is no longer being utilized. The VM controller can determine if the VM should have a status parameter that indicates the VM should be shut down for reasons other than exceeding the target number of VMs for that game type. A VM's status parameter can be updated to a shutdown state if the VM controller determines that there is an abnormal condition or state within the game session and VM. An abnormal condition, i.e. an issue or problem with the game session, can be corruption or tampering of data, files, or software code, injected code, viruses, run-away, hung, or looped processes, or other conditions or states of abnormality existing in the game session, operating system, and VM itself. Such adverse issues and problems can affect the game session and VM stability, health, and safety, as well as adversely affect a user's game play experience.

During or after shutting down a VM, the VM Controller can produce a notification that an abnormality was detected, such as saving the notification in a log file, submitting the notification to a game system operations center, or by sending the notification through an electronic means, such as an e-mail or text message. If the target number of VMs is not met after shutting down the VM with the detected abnormality, the VM Controller can instantiate one or more additional VMs to achieve the target number of VMs.

Turning now to the figures, FIGS. 1A and 1B illustrate block diagrams of game system 100, demonstrating an example of how various VMs can be handled within a VMG. In computing system 100 of FIG. 1A there is a VM controller 121 and a VMG 120 that includes two VMs, VM-A 123 and VM-B 127. VM-A 123 is an unassigned VM, meaning that it is not being actively utilized by a user and that is has an available status parameter. VM-B 127 is actively being utilized by User 1.

FIG. 1B illustrates the game system 100 after the occurrence of two actions. First, the VM controller 121 has, through a determination, updated VM-A 123's status parameter to indicate that it should be shut down. The shutdown can be for various reasons, such as if there exists an excess number of VMs above a target number of VMs or that an abnormal state or condition was detected in VM-A 123.

The second action being demonstrated is that VM-B 127 was ended by User 1, such as quitting the game or abandoning the game session. VM controller 121 acknowledged the status parameter change of VM-B 127 to indicate that VM-B 127 is now available for other users. VM controller 121 then allocated VM-B 127 as VM-B 137 for User 2 and enabled VM-B 137 for User 2's further game session interactions.

Figure 2:
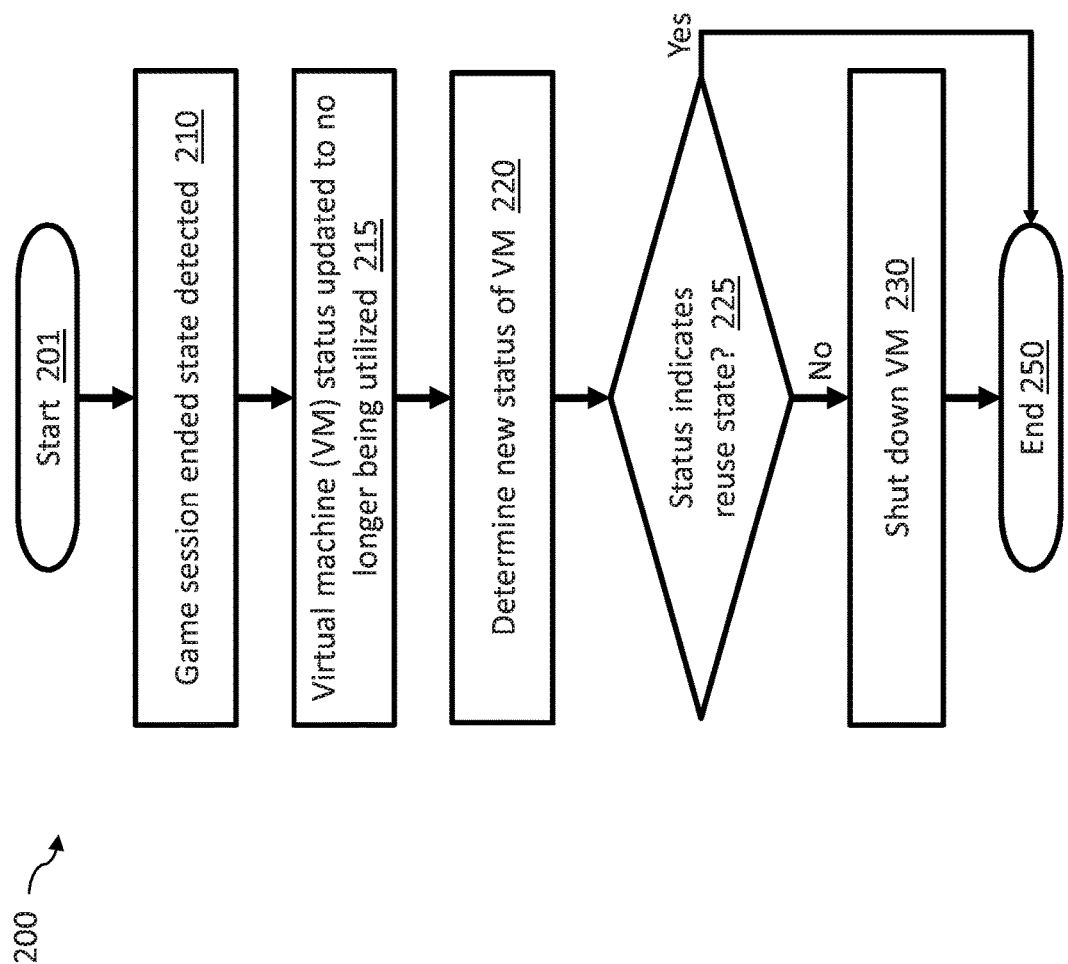
FIG. 2 illustrates a flow diagram of an example of a method for determining a status parameter of the VM and handling the VM's disposition.

FIG. 2 illustrates a flow diagram of an example method 200 for determining a status parameter of a VM and handling the VM's disposition. The VMs can be part of a game system and used for game sessions for various users and game types. The method 200 or at least part thereof can be performed by a VM controller as disclosed herein, such as VM controller 121. The method starts at a step 201.

The method 200 proceeds to a step 210 where a game system detects that a game session has moved to an ended state. The ended state can be by a positive action, such as if the user navigated to a home or main page, or selected a command, such as exit or quit. The ended state can also be detected if a user abandons a game session, as determined by a time out value or if the communication between the user's computing system and the game system is no longer coupled. Thus, ended states can be detected via a designated action (active detection) or via no action (passive detection).

Proceeding to a step 215 the VM's status parameter can be updated to indicate that the VM is no longer being utilized by a user. In a step 220, the status or new status of the VM is determined. The status of the VM can be updated to a status parameter indicating that the VM is available for another user. The VM status parameter can also be changed to indicate another state or action. For example, the status parameter can be changed for a variety of reasons, such as if there are available VMs in excess of a target number or if an abnormal condition or state is detected within the VM and game session.

In a decision step 225, the method 200 utilizes the VM's status parameter to determine if the VM can be reused. If the VM status parameter indicates that the VM can be reused, the method 200 continues to step 250 and ends. If the VM status parameter indicates that the VM cannot be reused, then the method 200 proceeds to a step 230.

At step 230, the VM is shutdown. The shutdown or closing of the VM can include updating status parameters, logging, and other information that may need to be tracked for such an event, such as communicating a notification of the shutdown. The method 200 then continues to step 250 and ends.

Figure 3:
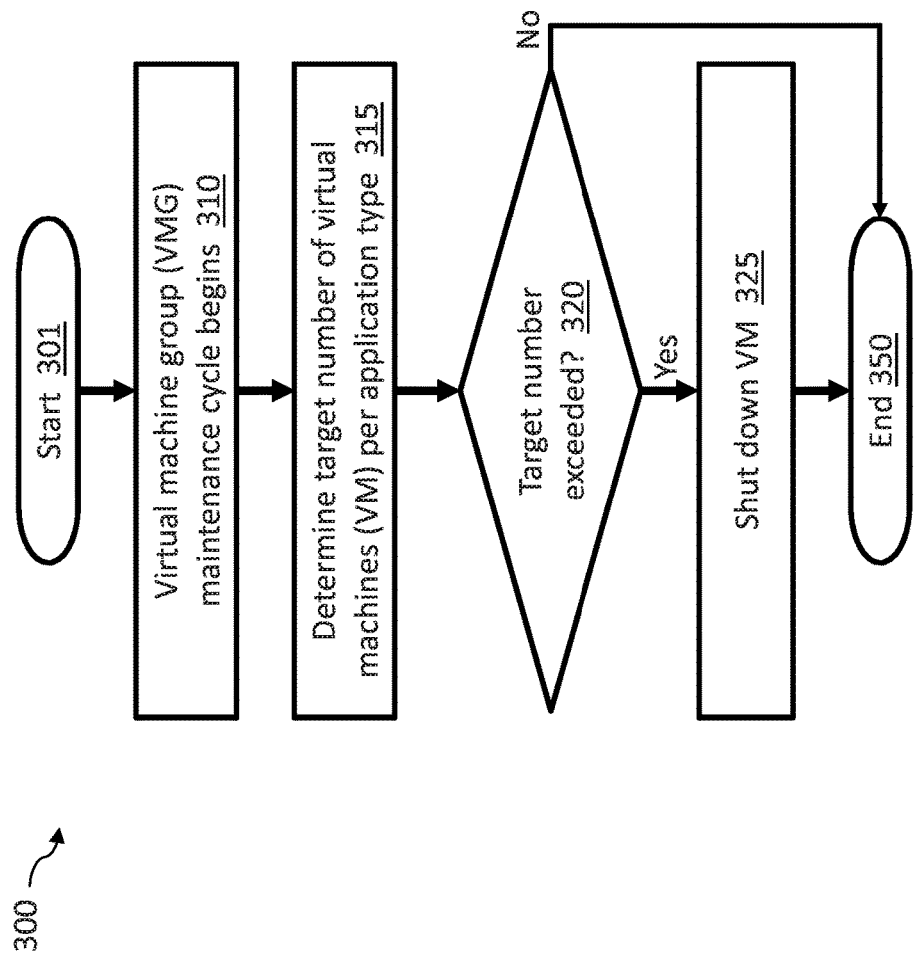
FIG. 3 illustrates another flow diagram of an example of a method for determining a target number of active VMs and handling an excess count of VMs.

FIG. 3 illustrates a flow diagram of an example method 300 for determining a target number of active VMs and handling an excess count of VMs. The VMs can be part of a system and used for sessions for various users and various applications or games. The method 300 or at least part thereof can be performed by a VM controller as disclosed herein, such as VM controller 121. The method 300 starts at a step 301.

The method 300 proceeds to a step 310 where managing the VMs located in a VMG begins. The managing or management of the VMs can be done in real-time, such as when a VM's status parameter is changed, or it can be done in a batch or periodic cycle, such as every ten minutes or one hour. The managing can include maintaining the VMs.

Proceeding to a step 315 a new target number of VMs per type, such as application or game type, can be determined. The target number can change by utilizing various factors, such as time of day, day of the week, day of the year, calendar holidays, usage patterns, and physical location of the VMG. The target number can also be changed at a time when a separate VMG is instantiated at the current VMG location or a separate VMG location and the target number of VMs can be balanced between the multiple VMGs.

Proceeding to a decision step 320, a determination is made if the target number of VMs has been exceeded by the number of instantiated VMs. The target number can be a total number of instantiated VMs, or it can be a number of available and unused VMs. If the target number of VMs is not exceeded, then the method 300 continues to step 350 and ends.

If the decision step 320 results in a target number of VMs being exceeded then the method 300 proceeds to a step 325. In the step 325, the VMs in excess of the target number are shutdown, thereby saving computing resources and financial costs associated with the computing resources. The method 300 continues to the step 350 and ends.

Figure 4:
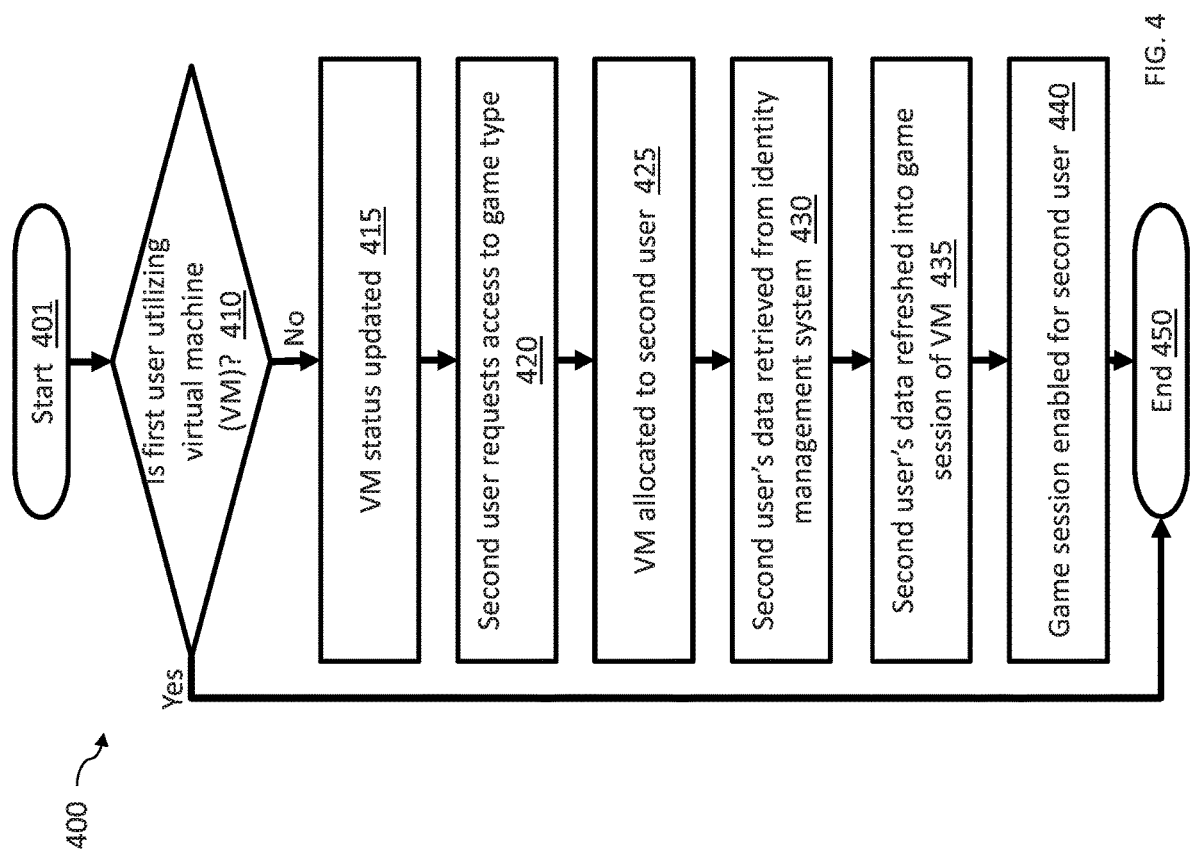
FIG. 4 illustrates another flow diagram of an example of a method for allocating an existing and unused VM to service a user's request.

FIG. 4 illustrates a flow diagram of an example method 400 for allocating an existing and available VM to service a user's request. The VM can be part of a game system and used for game sessions for various users and game types. The method 400 or at least part thereof can be performed by a VM controller as disclosed herein, such as VM controller 121.

The method 400 begins at a step 401 and proceeds to a decision step 410. In decision step 410, the method 400 determines if the VM is being utilized by a first user. If a determination is made that the VM is being utilized by the first user then the method 400 continues to step 450 and ends.

If the VM is not being utilized by the first user, then the method 400 proceeds to a step 415. The first user can stop utilizing a VM by taking an action, such as navigating to a particular location within the game session, such as a main menu, selecting a quit, exit, hot key, or other command, or the first user can abandon the game session and VM if a time out condition occurs or if the communication coupling between the first user's computing system and the game system is lost. Step 415 updates the VM status parameter to indicate that the VM is no longer being utilized by the first user. In the alternative, the VM may have never been used by the first user, such as when the VM Controller instantiated the VM prior to a user request. In this aspect, the VM's status parameter would indicate that the VM is available.

At a step 420, a second user requests access to a game type. For example, the second user may wish to play FIFA® and the first user's game session was also FIFA®. At a step 425, the determined VM is allocated to the second user. At a step 430, the second user's data and configuration information is retrieved from a data store, such as an IMS. The second user's information can be correlated by game type allowing the second user to use the same or different information depending on the game type.

At a step 435, the second user's data and configuration information is loaded into the game session running on the VM. At a step 440, the game session running on the VM is enabled for the second user. Enabling can include a variety of steps or processes to bring the game session to a time when the second user can successfully interact with the game session. These steps and processes can include retrieving other data, allocating computing resources, and restarting the game session, or restarting or resetting one or more application processes within the game session. The method 400 then ends at the step 450.

Figure 5:
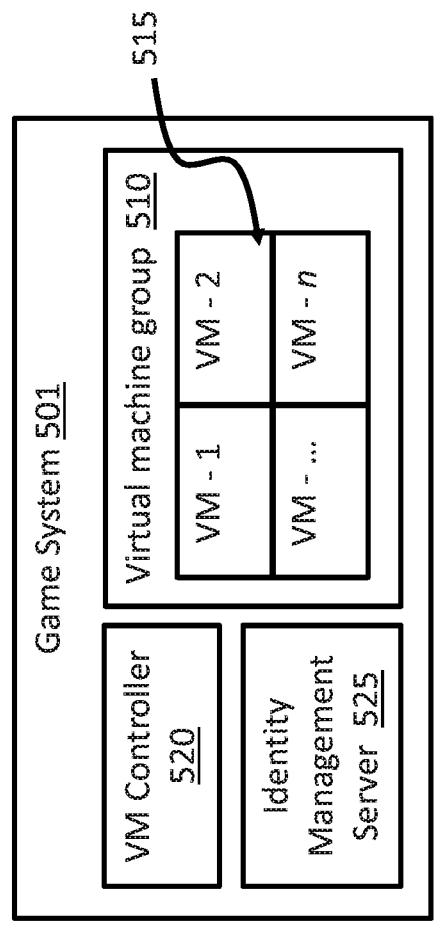
FIG. 5 illustrates a block diagram of an example game system demonstrating some of the components of the game system.

FIG. 5 illustrates a block diagram of an example game system 501 constructed according to the principles of the disclosure. Game system 501 includes components VMG 510, VM controller 520, and IMS 525. VMG 510 can include one or more VMs 515. In the game system 501 the VMs 515 are labeled as VM-1 through VM-n. Game system 501 is a logical grouping of components by functionality for demonstrating the processes involved with this disclosure. The components can be coupled together via conventional connectors/connections.

The components 510, 515, 520, and 525 can be combined or separated in various combinations. The physical software application that runs these processes can be a software application or separated among two or more software applications. In addition, the separate software applications do not need to be executed on the same server or be proximate to the other components. For example, the IMS component 525 can be physically located in a data center in Oregon while the VM controller 520 and VMG 510 can be physically located in a data center in Virginia.

VM controller 520 is communicatively coupled to VMG 510 and IMS 525. VM controller 520 can execute several tasks, for example, determining a target number of VMs for a game type using factors such as the time of day, usage patterns, day of the week, and other factors. The VM controller 520 can also inspect and check the VMs 515 to ensure they are ready for a user's game session. The VM controller 520 can detect abnormality in the game session or VM, such as a data or file corruption, injected code, viruses, or disrupted, hung, or looped processes within the game session. If the number of VMs exceed a target number of VMs or if an abnormality is detected, then the VM controller 520 can shut down the VM thereby freeing up computing resources for other tasks or reducing computing resources thereby reducing the financial cost of operating the game system 501.

The IMS 525 can be one or more of a variety of data stores, data files, databases, or other types of data storage media or devices. IMS 525 can store a user's data and configuration information and can, in some aspects, correlate the user's data and configuration information by game type allowing a user the option of using differing sets of information for different game types.

Figure 6:
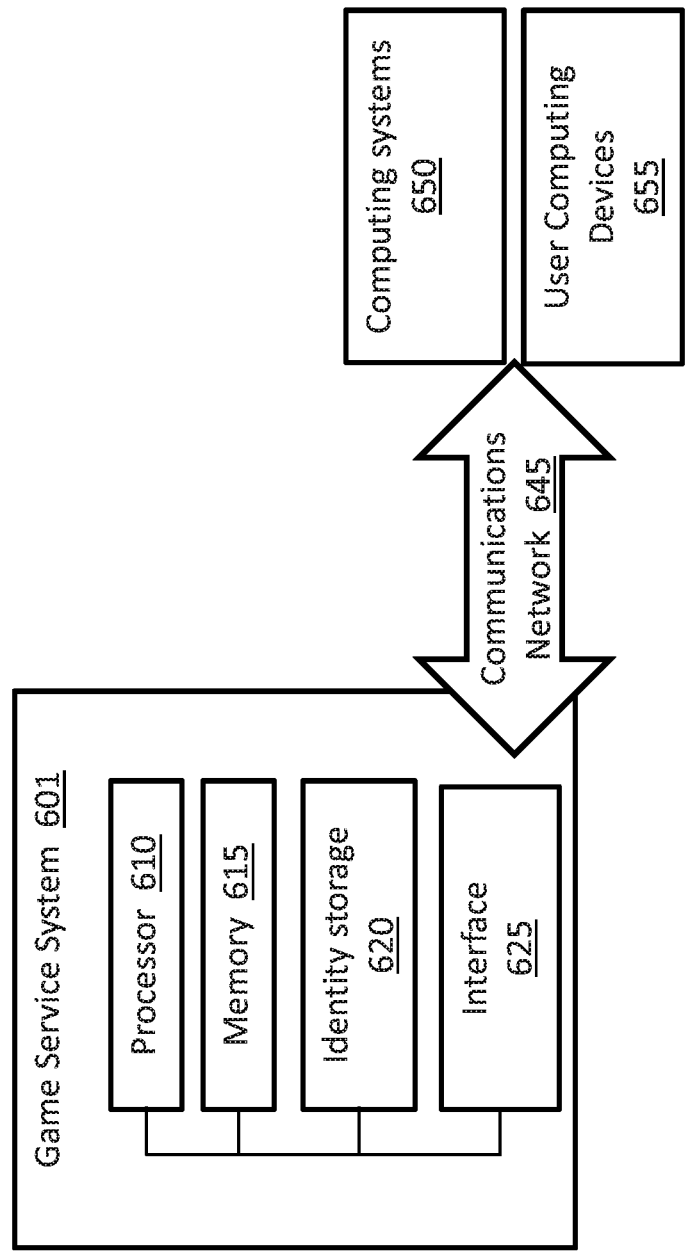
FIG. 6 illustrates a block diagram of an example game services system integrated with other computing systems.

FIG. 6 illustrates a block diagram of an example game service system 601 constructed according to the principles of the disclosure. Game service system 601 can be a cloud gaming service. In one aspect, the game service system 601 can be a Gaming as a Service (GaaS) solution. FIG. 6 illustrates the game service system 601 integrated with other computing systems or devices. Game service system 601 includes processor 610, memory 615, identity storage 620, and interface 625. Interface 625 is communicatively coupled, via communications network 645, to other computing systems 650 and user computing devices 655.

Processor 610, memory 615, identity storage 620, and interface 625 are communicatively coupled by, for example conventional connectors/connections. Processor 610, memory 615, identity storage 620, and interface 625 are illustrated in FIG. 6 as singular components. In an alternative, these components can exist as one or more components and the components can be located proximate to, or separate from, the others. The components can also be combined or separated as appropriate for an implementation. For example, the identity storage 620 can be part of or separated from the memory 615.

Processor 610 can execute and process commands, algorithms, instructions, and other tasks to operate the game service system 601. Processor 610 is configured to operate a VMG environment where the VMG environment can be capable to run, maintain, and operate one or more VMs. Processor 610 can also be configured to operate as a VM controller to maintain and track a status parameter of the VMs, to allocate or instantiate VMs to meet user requests for a game session, to retrieve user data and configuration information from the identity storage 620 and load such data and information into the VMs, and to enable the VMs and game sessions for user interaction.

The operations of the processor 610 can be directed by one or more software applications that can operate or be executed by one or more processors. For example, a set of processors can be allocated to operate the game service system operations and operate the input and output of data, a second set of processors can be allocated to operate the VMG, and a third set of processors can be allocated to operate the VM controller. These operations of the processor 610 can be executed proximate or separate from one another. For example, processor 610 can include a set of processors located in California and a second set of processors located in Oregon working together to form game service system 601.

Memory 615 can store data, instructions, algorithms, and software programming that are employed to direct the operations of the processor 610. Memory 615 can be a conventional type of memory and can be located proximate to or separated from the other components and can be located in one or more separate locations.

Identity storage 620 is a type of data storage mechanism that can store user data and configuration information and correlate that data and information by a game type. For example, a user can have different configuration information when playing different game types. Identity storage 620 can be located proximate to or separated from the other components and can be located in one or more separate locations.

Interface 625 is configured to communicate with other computing systems 650, such as human readable devices, for example, a computer with a display, a printer, or a monitor, or to other computing systems 650, for example, another game service system located proximate or separate from game service system 601. In addition, interface 625 can provide communication coupling with user computing devices 655. For example, a user can send and receive information with game service system 601 through communications network 645 and interface 625. This can allow a user located, for example, in New Jersey, to communicatively connect to a game service system located in Virginia in order to interact with a selected game type. Communications network 645 can transmit or carry various communications by a variety of network types, for example, the public internet, to the interface 625. The communications network 645 and the interface 625 can be conventional components. The user computing devices 655 can be conventional computing devices that are configured to allow cloud gaming. The user computing devices 655 can be a smartphone, a computing pad, a laptop, a desktop, etc.

A portion of the above-described apparatus, systems or methods may be embodied in or performed by various, such as conventional, digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described aspects. It is also to be understood that the terminology used herein is for the purpose of describing particular aspects only, and is not intended to be limiting, since the scope of the present disclosure will be limited only by the claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method of operating a game streaming system, comprising:
    maintaining a group of instantiated virtual machines (VMs) preloaded with one or more game types in a virtual machine group (VMG), wherein said VMG has a target number of instantiated VMs for each of said one or more game types for a predefined time period;
    determining said target number of instantiated VMs for one of said one or more game types in said VMG when another VMG having an instantiated VM that is preloaded with said one game type is created in a same physical server as said VMG;

detecting an ended game session state for a game session of a user during said predefined time period, where said game session is supported by one of said instantiated VMs in said VMG;

upon said detecting, updating a status parameter of said one instantiated VM based on said one game type associated with said ended game session and said target number of instantiated VMs for said one game type for said predefined time period;

maintaining said one instantiated VM and said game session when said status parameter indicates said one instantiated VM be reused, wherein said status parameter indicates said one instantiated VM be reused when a total number of instantiated VMs, which includes a number of instantiated VMs being actively utilized and a number of instantiated VMs available for said one game type in said VMG, does not exceed said target number of instantiated VMs for said one game type for said predefined time period;

shutting down said one instantiated VM when said status parameter indicates said one instantiated VM not be reused, wherein said status parameter indicates said one instantiated VM not be reused when an abnormal condition is detected on said one instantiated VM or when said total number of instantiated VMs for said one game type in said VMG exceeds said target number of instantiated VMs for said one game type for said predefined time period; and allowing said number of instantiated VM being actively utilized to be higher than said target number of instantiated VMs for said one game type for said predefined time period when directed by user demand.

2. The method as recited in claim 1, further comprising:
if said target number of instantiated VMs for said one game type for said predefined time period is not met after said shutting down said one instantiated VM, on which said abnormal condition was detected, instantiating at least one additional VM to achieve said target number of instantiated VMs for said one game type for said predefined time period.

3. The method as recited in claim 1, wherein said target number of instantiated VMs for said one game type varies on at least one of a time of day, a day of the week, a day of the year, calendar holidays, usage patterns, and a physical location of said VMG.

4. The method as recited in claim 1, wherein said VMG supports multiple game types, each of said game types having a different target number of instantiated VMs.

5. The method as recited in claim 1, further comprising:
detecting whether said abnormal condition is within said one instantiated VM when said one instantiated VM is not utilized; and submitting a notification that said abnormal condition was detected to a system operations center during said shutting down.

6. The method as recited in claim 1, further comprising:
allocating said one instantiated VM to said user;
updating said game session with identity management information (IMI) of said user; and
enabling said game session for said user.

7. The method as recited in claim 6, further comprising:
loading a last saved point of said user using said IMI; and
enabling said game session using said last saved point.

8. The method as recited in claim 1, wherein said game streaming system is a cloud game streaming system.

9. A non-transitory computer readable medium storing instructions that, when executed by a data processing apparatus, perform operations comprising:

operating a virtual machine group (VMG), that includes one or more instantiated virtual machines (VMs) preloaded with one or more application types, wherein said VMG has a target number of instantiated VMs for each of said one or more application types for a predefined time period and at least one of said instantiated VMs in said VMG is configured to support an application session of a user;

determining said target number of instantiated VMs for one of said one or more application types in said VMG when another VMG having an instantiated VM that is preloaded with said one application type is created in a same physical server as said VMG;

detecting that said application session has moved to an ended state during said predefined time period;

upon said detecting, updating a status parameter of said at least one instantiated VM based on said one application type associated with said ended application session and said target number of instantiated VMs for said one application type for said predefined time period;

shutting down said at least one instantiated VM when said status parameter indicates said at least one instantiated VM not be reused, wherein said status parameter indicates said at least one instantiated VM not be reused when an abnormal condition is detected on said at least one instantiated VM or when a total number of instantiated VMs, which includes a number of instantiated VMs being actively utilized and a number of instantiated VMs available for said one application type in said VMG exceeds said target number of instantiated VMs for said one application type for said predefined time period;

maintaining said at least one instantiated VM and said application session when said status parameter indicates said at least one instantiated VM be reused, wherein said status parameter indicates said at least one instantiated VM be reused when said total number of instantiated VMs for said one application type in said VMG does not exceed said target number of instantiated VMs for said one application type for said predefined time period; and allowing said number of instantiated VM being actively utilized to be higher than said target number of instantiated VMs for said one application type for said predefined time period when directed by user demand.

10. The non-transitory computer readable medium as recited in claim 9, wherein if said target number of instantiated VMs for said one application type for said predefined time period is not met after said shutting down said one instantiated VM, on which said abnormal condition was detected, instantiating at least one additional VM to achieve said target number of instantiated VMs for said one application type for said predefined time period.

11. The non-transitory computer readable medium as recited in claim 9, wherein each of said application types has a different target number of instantiated VMs.

12. The non-transitory computer readable medium as recited in claim 9, wherein said target number of instantiated VMs for said one application type varies based on at least one of a time of day, a day of the week, a day of the year, calendar holidays, usage patterns, and a physical location of said VMG.

13. The non-transitory computer readable medium as recited in claim 9, wherein said operations further comprise:

storing and retrieving said user's data;

loading said user's data into one of said instantiated VMs of said VMG having an operating system and application type already loaded; and enabling said one of said instantiated VMs for use by said user.

14. The non-transitory computer readable medium as recited in claim 13, wherein said enabling includes loading and using a last saved point from said user's data.

15. The non-transitory computer readable medium as recited in claim 9, wherein said VMG is located in a cloud environment.

16. A game streaming service system, comprising:

an identity management server (IMS) operable to manage user data and correlate said user data to a game type; and a processor, communicatively coupled to said IMS, operable to:

manage a virtual machine group (VMG) having instantiated virtual machines (VMs) preloaded with one or more game types, wherein said VMG has a target number of instantiated VMs for each of said one or more game types for a predefined time period;

determine said target number of instantiated VMs for one of said one or more game types in said VMG when another VMG having an instantiated VM that is preloaded with said one game type is created in a same physical server as said VMG;

when a game session supported by at least one of said instantiated VMs moves to an ended state during said predefined time period, update a status parameter of said at least one instantiated VM based on said one game type associated with said ended game session and said target number of instantiated VMs for said one game type for said predefined time period;

when said status parameter indicates said at least one instantiated VM be reused, allocate said at least one instantiated VM to meet a user request, load user data using said IMS, and enable said game session on said at least one instantiated VM, wherein said status parameter indicates said at least one instantiated VM be reused when a total number of instantiated VMs, which includes a number of instantiated VMs being actively utilized and a number of instantiated VMs available for said one game type in said VMG, does not exceed said target number of instantiated VMs for said one game type for said predefined time period;

when said status parameter indicates said at least one instantiated VM not be reused, shut down said at least one instantiated VM, wherein said status parameter indicates said at least one instantiated VM not be reused when an abnormal condition is detected on said at least one instantiated VM or when said total number of instantiated VMs for said one game type in said VMG exceeds said target number of instantiated VMs for said one game type for said predefined time period; and allow said number of instantiated VM being actively utilized to be higher than said target number of instantiated VMs for said one game type for said predefined time period when directed by user demand.

17. The game streaming service system as recited in claim 16, wherein each of said one or more game types has a different target number of instantiated VMs.

18. The game streaming service system as recited in claim 16 wherein said target number of instantiated VMs for said one game type is based on at least one of a time of day, a day of the week, a day of the year, calendar holidays, usage patterns, and physical location of said VMG.

* * * * *